US007150497B1

(12) United States Patent
Smith et al.

(10) Patent No.: US 7,150,497 B1
(45) Date of Patent: Dec. 19, 2006

(54) STAND-UP OPERATOR'S PLATFORM FOR A TRUCK-MOUNTED AERIAL DEVICE

(75) Inventors: Dean H. Smith, Eagle, NE (US); William D. Schneider, Malcolm, NE (US)

(73) Assignee: Westchester Capital, L.L.C., Omaha, NE (US)

( * ) Notice: Subject to any disclaimer, the term of this patent is extended or adjusted under 35 U.S.C. 154(b) by 165 days.

(21) Appl. No.: 10/938,964

(22) Filed: Sep. 10, 2004

Related U.S. Application Data

(60) Provisional application No. 60/603,842, filed on Aug. 23, 2004.

(51) Int. Cl.
*B60N 27/00* (2006.01)

(52) U.S. Cl. .......................... 296/190.01; 296/190.03; 296/190.04

(58) Field of Classification Search ........... 296/190.01, 296/190.03, 190.04
See application file for complete search history.

(56) References Cited

U.S. PATENT DOCUMENTS

| | | | | | |
|---|---|---|---|---|---|
| 3,638,806 | A * | 2/1972 | Hippach | ..................... | 212/231 |
| 3,860,088 | A * | 1/1975 | Gellatly | ..................... | 182/2.3 |
| 4,457,338 | A * | 7/1984 | Moller et al. | ............... | 137/615 |
| 5,522,584 | A * | 6/1996 | Kononov et al. | ...... | 254/134.3 R |
| 6,244,450 | B1 * | 6/2001 | Woodling | ................... | 212/349 |
| 6,477,730 | B1 * | 11/2002 | Marrero | ....................... | 180/41 |
| 6,543,578 | B1 * | 4/2003 | Merz | ......................... | 182/2.11 |

* cited by examiner

*Primary Examiner*—Lori L. Coletta
(74) *Attorney, Agent, or Firm*—Thomte, Mazour & Niebergall; Dennis L. Thomte

(57) ABSTRACT

A stand-up operator's platform for a truck-mounted aerial device wherein a turret is supported for rotation on the frame of the truck about a vertical axis. The stand-up operator's platform of this invention is secured to one side of the turret for rotation therewith which enables the operator, when standing on the platform of the stand-up operator's platform, to observe the operations of the aerial device regardless of the rotatable position of the turret thereof.

11 Claims, 8 Drawing Sheets

STAND-UP OPERATOR'S PLATFORM FOR A TRUCK-MOUNTED AERIAL DEVICE

CROSS-REFERENCE TO RELATED APPLICATION

This application claims the benefit of U.S. Provisional Application Ser. No. 60/603,842 entitled STAND-UP OPERATOR'S PLATFORM FOR A TRUCK-MOUNTED AERIAL DEVICE filed Aug. 23, 2004, the disclosure of which is hereby incorporated herein by reference.

BACKGROUND OF THE INVENTION

1. Field of the Invention

This invention relates to a stand-up operator's platform for a truck-mounted aerial device and more particularly to a stand-up operators platform for a truck-mounted aerial device such as a boom truck or the like wherein the stand-up operator's platform is secured to the rotatable turret thereof for movement therewith.

2. Description of the Related Art

Truck-mounted aerial devices such as a boom truck or the like normally have an operator's station positioned at one of three or more possible locations on the truck. In one prior art truck-mounted aerial device, the controls for the various operations of the boom thereof are located at the rear of the truck. In that situation, the operator stands on the ground at the rear of the truck and manually controls the various operations of the boom although the operator's vision is severely limited. In another prior art truck-mounted aerial device, the operator's station is located at one side of the truck behind the cab with the operator being supported on a stationary platform so as to be able to reach the controls for the boom. In that situation, the operator has difficulty seeing over the top of the cab which creates several blind spots. In another prior art truck-mounted aerial device, the operator's station is mounted on the rotatable turret but the operator must sit on a seat provided thereon to operate the controls. The operator's station including a seat takes up considerable space and restricts the positioning of the turret on the truck frame with respect to the rear end of the truck cab. In other words, in those truck-mounted aerial devices which include an operator's station having a seat provided thereon, the turret must be placed sufficiently far behind the truck cab so that the operator's station will not contact the rear of the truck cab as the turret is being rotated.

SUMMARY OF THE INVENTION

A stand-up operator's platform is provided for a truck-mounted aerial device including a frame having rearward and forward ends. An upstanding turret is supported for rotation on the frame about a vertical axis and has upper and lower ends. A telescoping boom assembly is pivotally secured to the turret. An operator's stand-up platform is secured to the turret for rotation therewith wherein the operator may stand thereon and control the various operations of the aerial device such as the turret, telescoping boom assembly, etc. In the preferred embodiment, the operators stand-up platform is at least partially surrounded by a cage to prevent the operator from falling from the platform. Also, in the preferred embodiment, the operator's stand-up platform is not large enough to permit the operator to sit. The height of the operator's platform with respect to the turret is sufficient to permit the operator to substantially observe all operations of the boom assembly and to see over the top of the truck cab. The operator's stand-up platform, in the preferred embodiment, is selectively removably secured to one side of the turret but may be positioned on the other side of the turret if it is so desired.

It is therefore a principal object of the invention to provide a stand-up operators platform for a truck-mounted aerial device wherein the operators platform moves with the rotating turret thereof.

Still another object of the invention is to provide a stand-up operators platform for a truck-mounted aerial device which may be secured to either side of the turret of the aerial device.

Still another object of the invention is to provide a stand-up operator's platform for a truck-mounted aerial device which enables the turret thereof to be positioned closely behind the truck cab.

Still another object of the invention is to provide a stand-up operator's platform for a truck-mounted aerial device which enables the platform to be rotated with the turret thereof so that the operator may observe the boom functions.

These and other objects will be apparent to those skilled in the art.

DESCRIPTION OF THE PREFERRED EMBODIMENT

Figure 1:
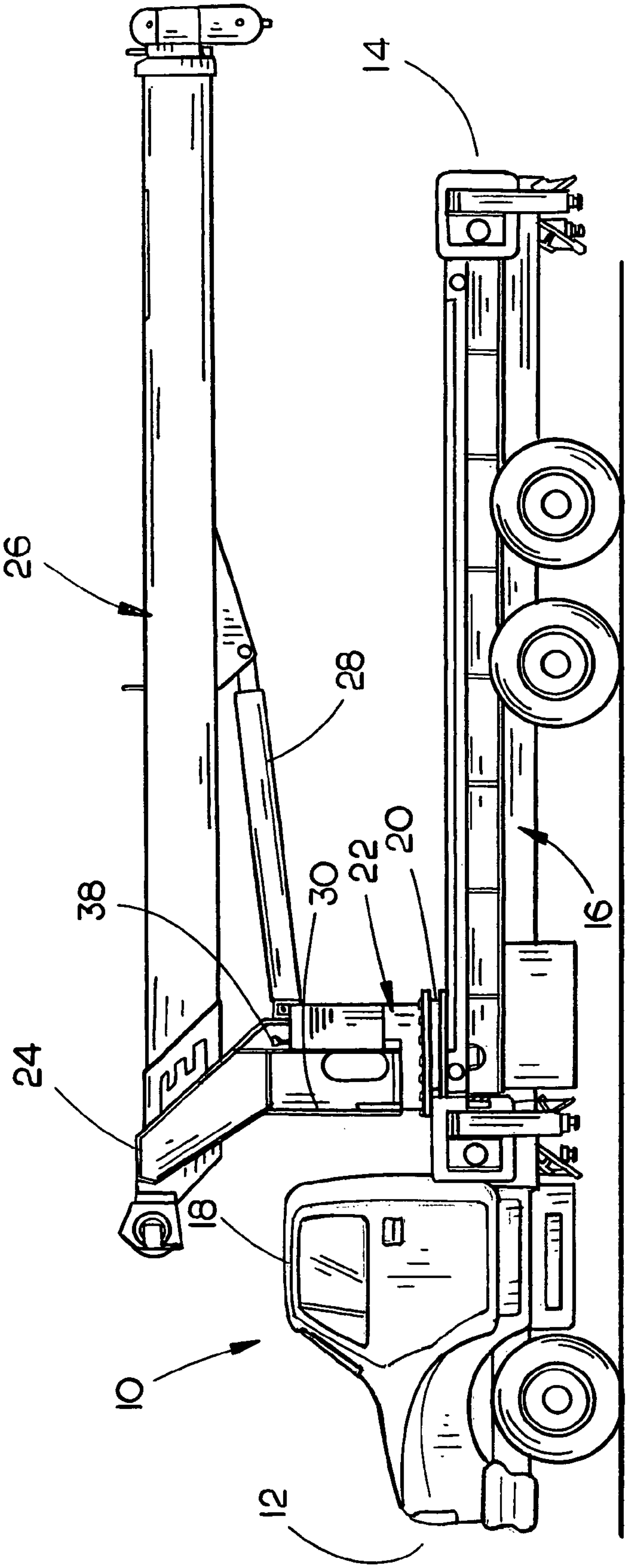
FIG. 1 is a side view of a truck-mounted aerial device such as a boom truck having the stand-up operator's platform of this invention mounted thereon.

The numeral 10 refers generally to a truck-mounted aerial device such as a boom truck having a forward end 12, rearward end 14, a frame 16 and a truck cab 18. The numeral 20 refers to a conventional turntable which is supported for rotation on the frame about a vertical axis. The numeral 22 refers to a turret which is supported on the turntable 20 for rotation therewith. Turntable 20 is rotated with respect to the frame 16 in conventional fashion. Turret 22 includes an upper end 24 having a telescoping boom assembly 26 pivotally secured thereto which is pivotally moved with respect thereto by means of a hydraulic cylinder assembly 28.

Figure 2:
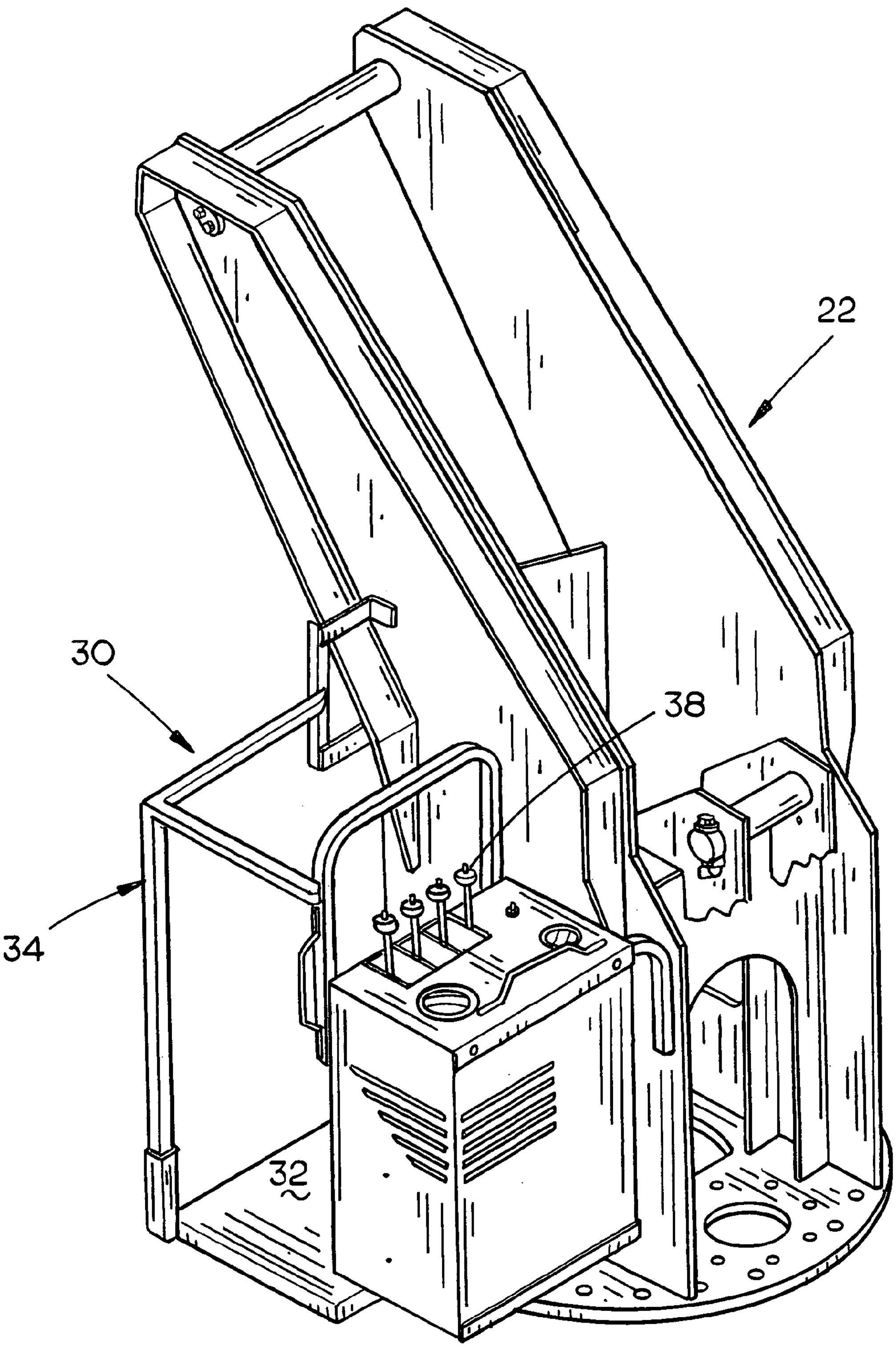
FIG. 2 is a perspective view of the rotatable turret of the truck-mounted aerial device.
Figure 3:
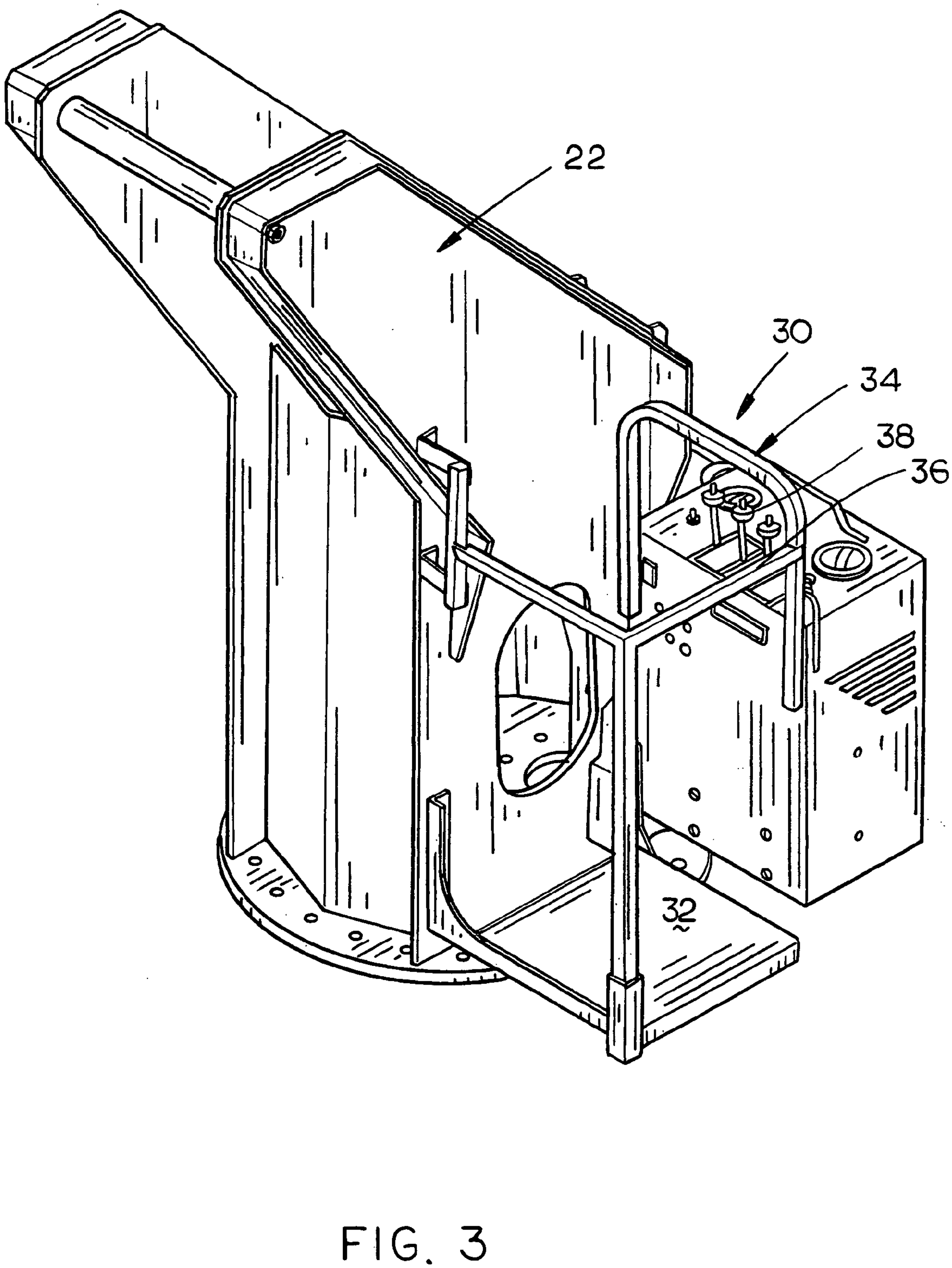
FIG. 3 is a perspective view similar to FIG. 2 except that the rotatable turret is seen at a different angle than that of FIG. 2.
Figure 4:
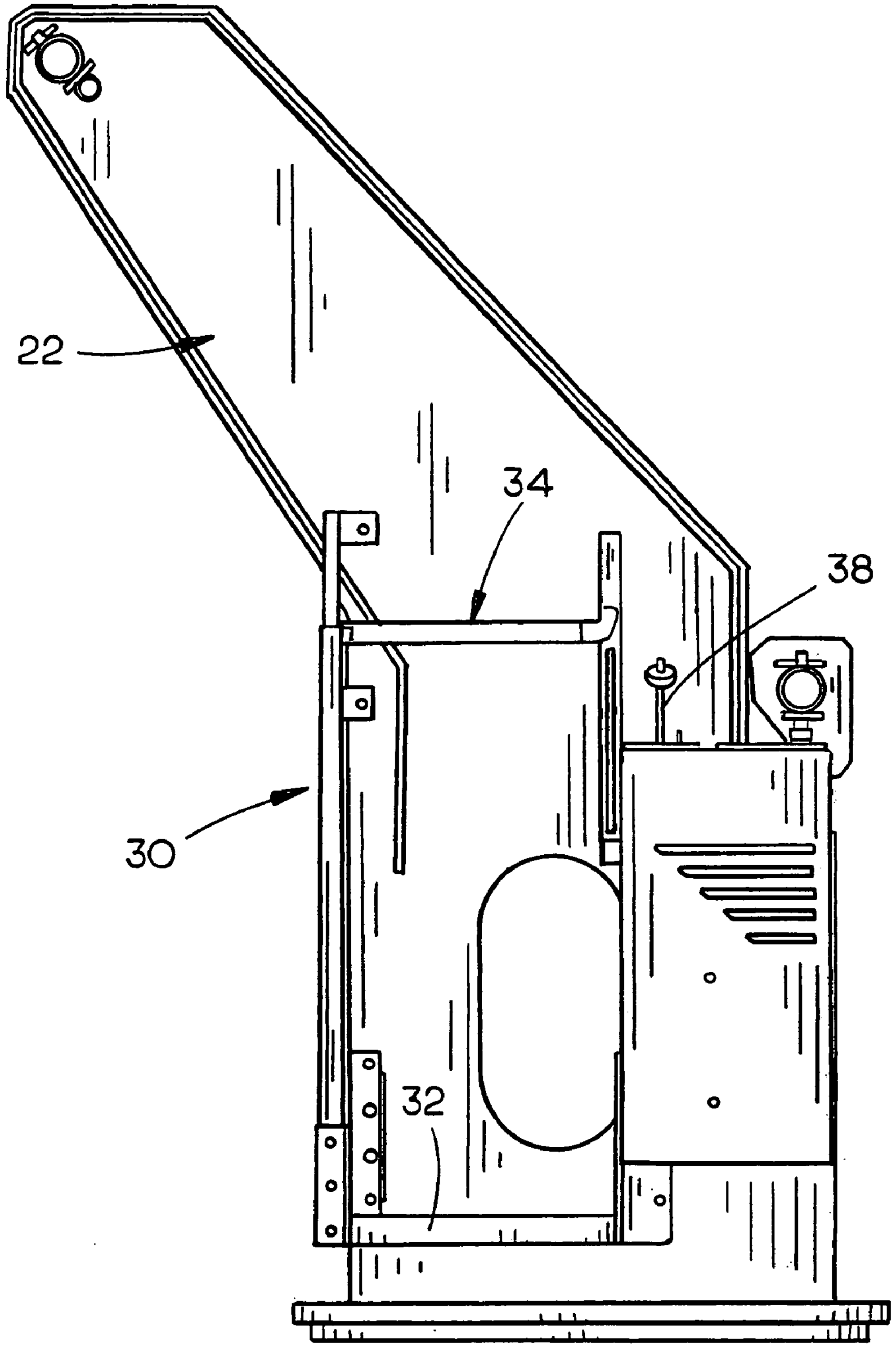
FIG. 4 is a side view of the turret and operator's platform.
Figure 5:
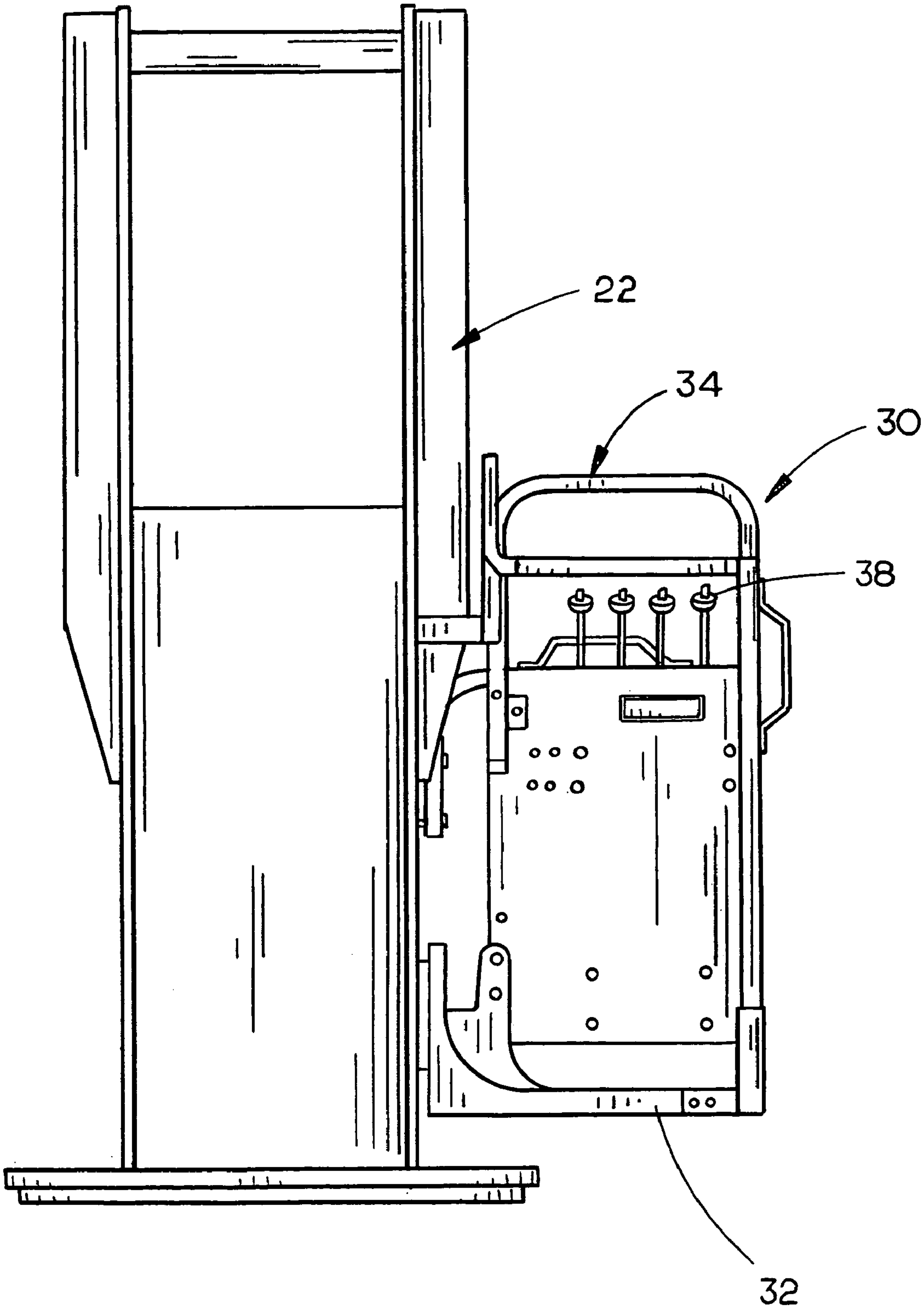
FIG. 5 is a further side view of the turret and operator's platform.
Figure 6:
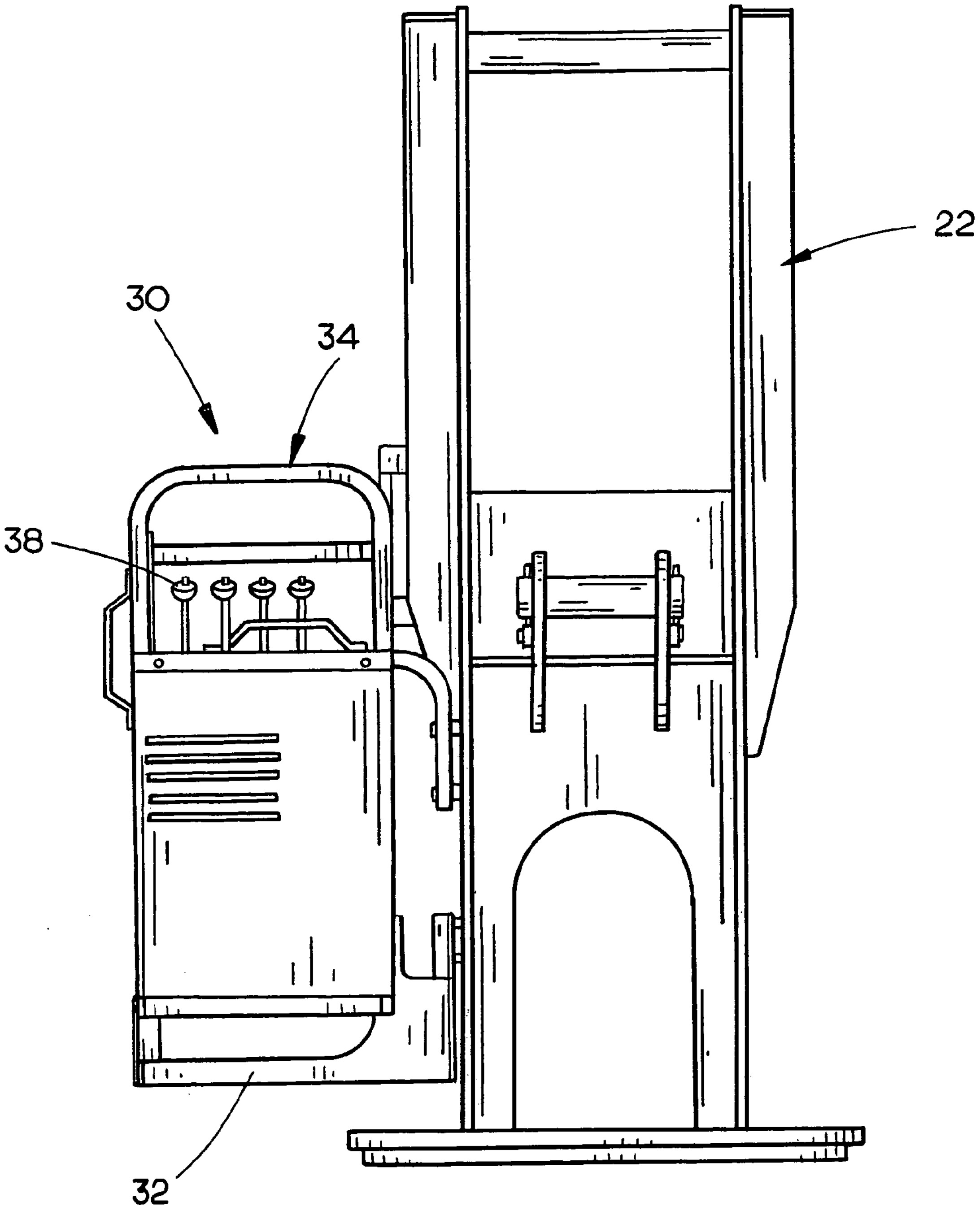
FIG. 6 is a further side view of the turret and operator's platform.
Figure 7:
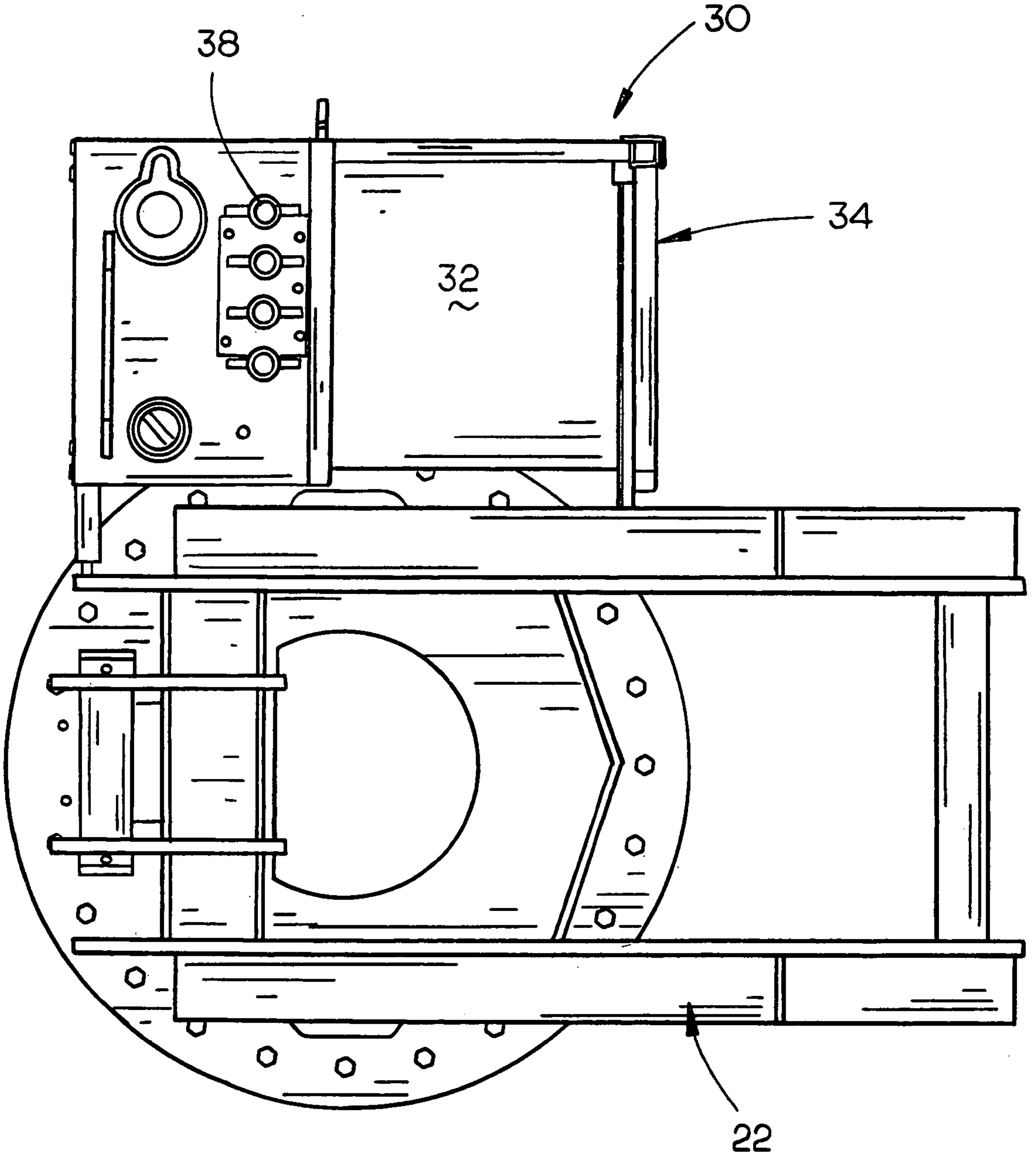
FIG. 7 is a top view of the turret and operator's platform.
Figure 8:
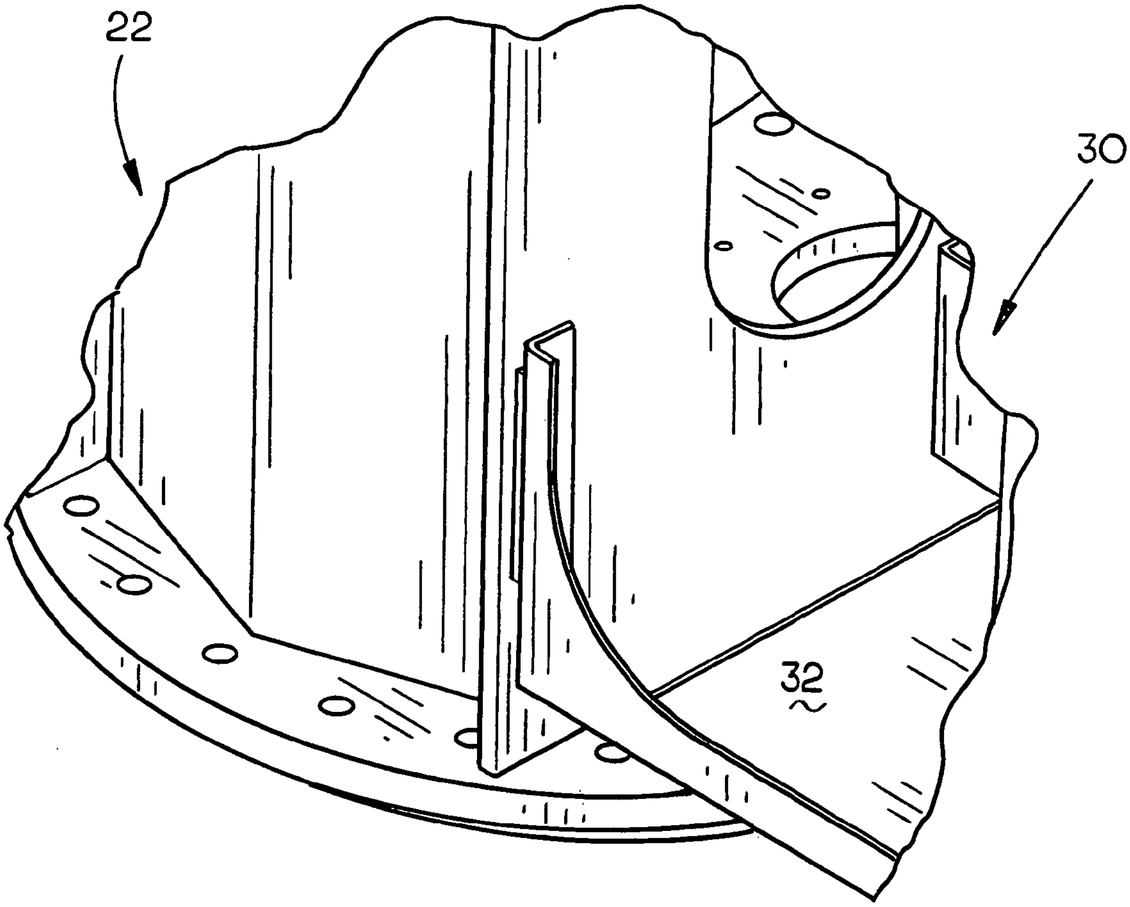
FIG. 8 is a partial perspective view illustrating the lower end of the turret and a portion of the lower end of the operator's platform.

The numeral 30 refers to an operator's platform assembly which is secured to one side of the turret 22, as seen in FIGS. 2 and 3. Platform assembly 30 includes a platform 32 which is bolted or otherwise secured to one side of the turret 22, as seen in FIG. 3. The numeral 34 refers to a cage which is secured to platform 32 and to one side of the turret 22 to prevent the operator from inadvertently falling from the platform 32. Preferably, one of the top rails 36 of the cage assembly 34 is pivotally mounted so as to provide access to the interior of the cage. The cage 34 is also preferably bolted to the turret 22. Although the drawings illustrate the operator's platform 30 secured to one side of the turret, the operator's platform 30 could be bolted to the other side of the turret if so desired. The operator's platform 30 is secured to the turret 22 so that the operator has access to the controls for the aerial device which are referred to generally by the reference numeral 38. The platform 32 is positioned on the turret 22 at a height sufficient so that an operator, of average height, can see over the top of the cab 18 and can visually observe all of the boom operations.

The platform 32 and the cage 34 are of a size which permits the operator to only stand on the platform 32 and cannot sit. The fact that the platform 32 and the cage 34 are as small as they are permits the turret 22 to be closely positioned on the frame 16 rearwardly of the cab 18 so that the operator's platform 30 will not engage the rearward end of the cab 18 as the turret 22 is rotated. If the operator's platform assembly was large enough to accommodate a seat such as in the prior art devices, the platform would protrude an objectionable amount from the turret 22 so as to strike the rearward end of the cab when the turret 22 is rotated. Further, when seated, the operator's visibility is limited.

Thus it can be seen that a novel stand-up operator's platform has been provided for a truck-mounted aerial device which accomplishes at least all of its stated objectives.

We claim:

1. In combination with a truck-mounted aerial device including a frame having rearward and forward ends and opposite sides, and a cab, comprising:

an upstanding turret supported for rotation on said frame about a vertical axis and having upper and lower ends and opposite sides;

a telescoping boom assembly pivotally secured to said turret;

and an operator's stand-up platform secured to said turret for rotation therewith wherein the operator may stand and control the operation of the turret and telescoping boom assembly.

2. The combination of claim 1 wherein said operator's stand-up platform is at least partially surrounded by a cage.

3. The combination of claim 1 wherein said operator's stand-up platform is not large enough to permit the operator to sit.

4. The combination of claim 1 wherein the height of said operator's stand-up platform, with respect to said turret, is sufficient to permit the operator to observe the operation of said boom assembly.

5. The combination of claim 1 wherein boom assembly and turret controls are accessible from said operator's stand-up platform.

6. The combination of claim 1 wherein the truck includes a cab at the forward end thereof and wherein said operator's stand-up platform is mounted on said turret at a height sufficient to permit the operator to see over the top of the cab.

7. The combination of claim 1 wherein said operator's stand-up platform is secured to one side of said turret.

8. The combination of claim 7 wherein said operator's stand-up platform is selectively removably secured to said turret.

9. The combination of claim 8 wherein said operator's stand-up platform is bolted to said turret.

10. The combination of claim 8 wherein said operator's stand-up platform is selectively bolted to either side of said turret.

11. The combination of claim 1 wherein said turret is secured to said frame closely behind the cab of the truck and wherein said operator's stand-up platform is secured to said turret so as to permit said turret to rotate 360° with respect to the cab and said frame.

* * * * *